No. 654,166. Patented July 24, 1900.
C. LEVEQUE.
MANIFOLD SALES BOOK.
(Application filed Feb. 17, 1900.)
(No Model.)
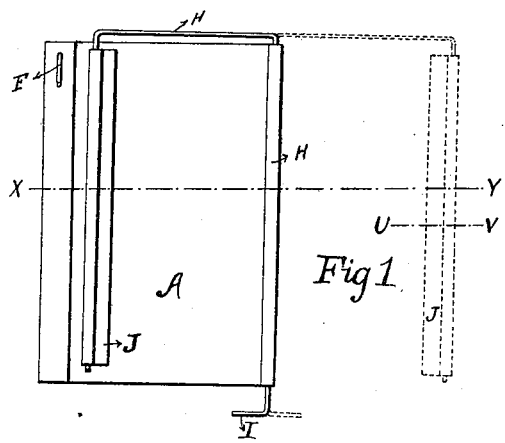
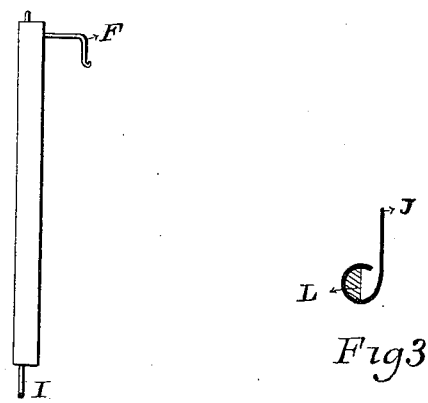
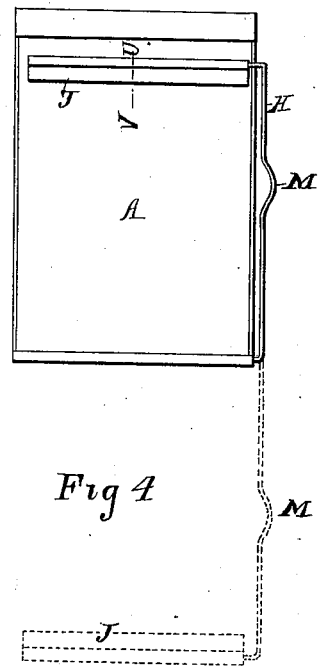
Witnesses:
Inventor:
Cyrille Leveque
Per
Clovis Leduc
Attorney.
THE NORRIS PETERS CO., PHOTO-LITHO., WASHINGTON, D. C.

UNITED STATES PATENT OFFICE.

CYRILLE LEVEQUE, OF TORONTO, CANADA.

MANIFOLD SALES-BOOK.

SPECIFICATION forming part of Letters Patent No. 654,166, dated July 24, 1900.

Application filed February 17, 1900. Serial No. 5,628. (No model.)

*To all whom it may concern:*

Be it known that I, CYRILLE LEVEQUE, a citizen of the Dominion of Canada, residing at Toronto, in the Province of Ontario, Canada, have invented a new and useful Manifold Check-Book, of which the following is a specification.

My invention relates to a device connected with the check-books now extensively used by commercial establishments to record their sales.

The object of my invention is to further facilitate the use of check-books and handle more conveniently the carbon-sheet which accompanies it, and consequently effect a greater saving of time.

Figure 1 is a top view of one arrangement of my invention closed and opened. Fig. 2 is a transverse section on line X Y of Fig. 1, the holder being opened. Fig. 3 is an enlarged transverse section of wrapper J or tube and the half-round wire inside of it on line U V of Figs. 1 and 4. Fig. 4 is a top view of a second arrangement of my invention. Fig. 5 is a side view of my invention.

Similar letters refer to similar parts throughout the several views.

A is a small board made of any kind of material. This board supports the check-book, and when made of metal, as shown in Figs. 1, 2, 3, and 4, is on one side bent twice at right angles in order to produce a channel B. The object of this channel is to contain and hold firmly on the board A the back of the check-book.

H is a three-sided frame revolving around one side of board. As shown in Fig. 1, the right-hand side of the board A is bent around one side of the frame H, which may then be easily revolved as on a hinge.

I is a handle made with the extension of a piece of wire of which the frame H is made. The side of the frame opposite to the hinge is flattened, so as to be half-round, and is covered by a wrapper J or tube made of a piece of thin metal, revolving one within the other. This wrapper or tube may be also affixed to the frame H and constitutes one side of it, and the half-tube L may revolve inside of the wrapper or tube.

Fig. 4 shows the same arrangement as Fig. 1, excepting that the frame revolves around one end of the board A instead of one side.

My invention can be used with any kind of check-books; but to understand how to use my invention it is necessary to know at least one kind of check-book which is very much used at the present time. Each sheet of the book is double, being folded half and half on each other, and being perforated along the fold, which is right on one edge of the book, the top half of the sheet can be easily detached.

At the present time to use this check-book a carbon-sheet is placed between the two halves of a sheet, on the top half, either attached or loosened, and the operator writes the account of the purchaser, which is also copied on the under half by the pressure of the pencil on the carbon-sheet.

To use my invention, the three-sided frame H is turned over by means of the handle I and occupies the position shown by the dotted lines in Fig. 1. The check-book is put on the board A, and its back is placed in the channel B, where it is secured firmly by bending down the upper part K of the piece of metal or material of which the channel B is made. The carbon-sheet is afterward fixed to the frame H by introducing it between the wrapper J or tube and the half-round wire L of Fig. 3. This being done, the wrapper or tube is revolved and the carbon-sheet is firmly secured. The frame is then brought back again on the check-book by means of handle I. Having an account to write and wishing to keep a copy of it, by means of the handle I the operator (clerk) opens the frame H, which revolves toward the right. He also opens the half of the first sheet of his book and brings the frame H in its former position. The carbon-sheet is then lying down on the lower half of the sheet on which the account is to be written. He then brings back the other half of the sheet on top of the carbon-sheet and writes the account, which is at the same time copied by the carbon-sheet on the half-sheet under. The top half-sheet is then given to the purchaser and the other half-sheet is revolved, as in the case of a book, and it is put under the hook F, which holds it out of the way of the next sheet. Fig. 4 is a view of the same invention shown by Fig. 1; but in this case the frame opens at one end of the board A instead of opening on one side, the same as for the check-book. The handle I of Fig. 1 is here replaced by handle M.

What I claim as my invention, and desire to secure by Letters Patent, is—

The combination of the board A containing the channel B, the hook F, with the frame H provided with the wrapper or tube J, substantially as described.

CYRILLE LEVEQUE.

Witnesses:
J. B. L. STARR,
E. S. PRINGLE.